H. A. HOUSE.
Fastener for the Meeting-Rails of Sashes.
No. 163,201.  Patented May 11, 1875.
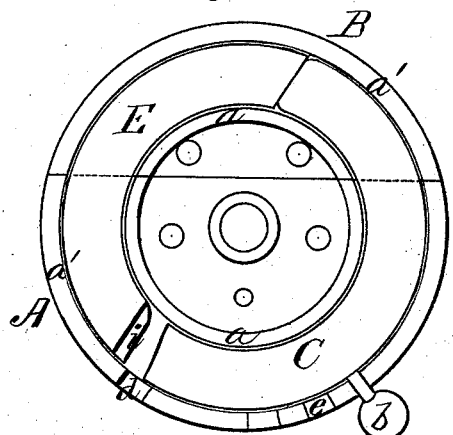
Fig. 1
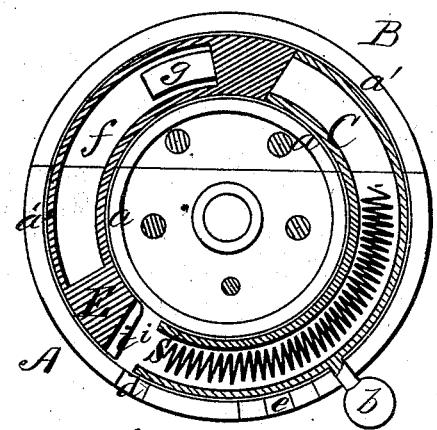
Fig. 2
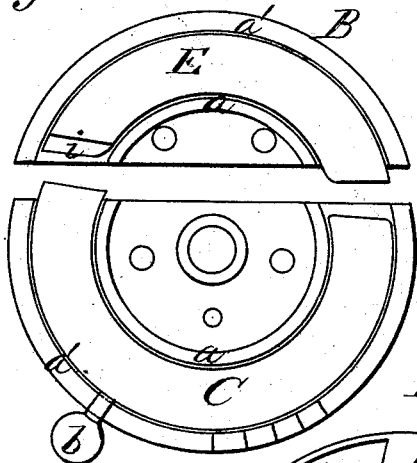
Fig. 3
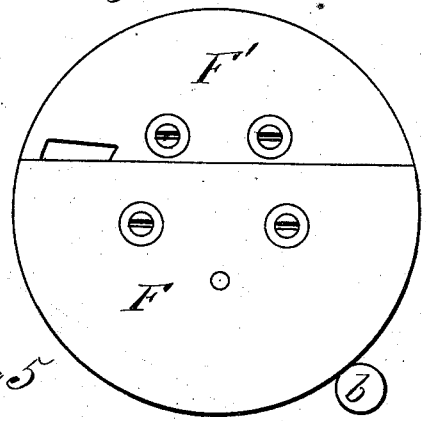
Fig. 4
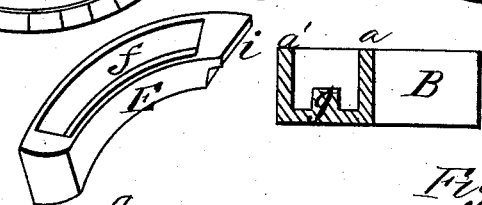
Fig. 5
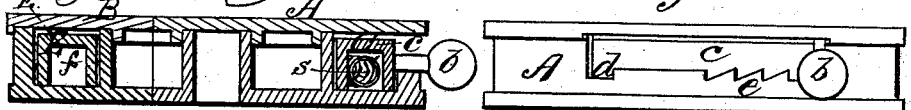
Fig. 6
Fig. 7
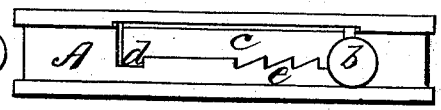
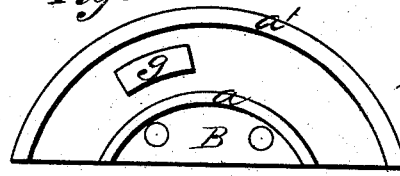
Fig. 8
WITNESSES
E. H. Bates
Francis Jellasi
INVENTOR
Henry A. House
Chipman Hosmer & Co.
ATTORNEYS
THE GRAPHIC CO. PHOTO-LITH. 39 & 41 PARK PLACE, N.Y.

UNITED STATES PATENT OFFICE.

HENRY A. HOUSE, OF BRIDGEPORT, CONNECTICUT, ASSIGNOR TO FRANK ARMSTRONG, OF SAME PLACE.

IMPROVEMENT IN FASTENERS FOR THE MEETING-RAILS OF SASHES.

Specification forming part of Letters Patent No. 163,201, dated May 11, 1875; application filed April 10, 1875.

CASE A.

*To all whom it may concern:*

Be it known that I, HENRY A. HOUSE, of Bridgeport, in the county of Fairfield and State of Connecticut, have invented a new and valuable Improvement in Automatic Sash-Fastener; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my device; and Fig. 2 is a sectional view of the same. Figs. 3 and 4 are plan views; and Figs. 5 and 6 sectional detail views. Figs. 7 and 8 are detail views.

This invention has relation to improvements in sash-fasteners which are designed to be secured upon the meeting-rails of the upper and lower sash; and the nature of the invention consists in a sectional circular bolt, one of the parts of which is within a casing adapted to be secured to the meeting-rail of the upper sash, and the other part in a similar casing applied upon the corresponding rail of the lower sash, when one of the parts or sections is thrust out of its case into that of the other, by the reaction of a suitable recessed spring, causing the other section of the bolt to be thrust into the end of the case of the spring-actuated section left vacant by the entry of the said bolt into the opposite casing, thereby causing an effective fastening for the sash. Also, it consists in a notched and toothed slot in the casing for holding the bolt at intermediate points, as will be hereinafter more fully described.

In the annexed drawings, A designates one and B the other of the casings of my improved sash-fastener, each being in the form of a segment of a shallow cylinder, and each provided with a circular groove of such relative dimensions that when the two casings are brought together the inner and outer walls $a'$ $a'$ of the said grooves shall be segments of concentric circles. Case A is preferably a larger segment than case B, and is designed to be secured to the meeting-rail of the lower sash, the latter being secured to the corresponding rail of the upper sash. C represents a sliding bolt of circular form, which is adapted to be inserted into the groove of the case A, and fit snugly therein, the under side thereof being provided with a correspondingly-shaped groove, within which is arranged a suitable coiled spring, S, one end of which is secured to bolt C, and the other to the casing. Bolt C being in the position shown in Fig. 3, spring S will be distended and will be held in this condition by the engagement of an operating-handle, $b$, working in a slot, $c$, in the periphery of the case, in a notch, $d$, cut in one end of the said slot. The other end of this slot is provided with a number of teeth, $e$, for a purpose hereinafter fully explained. E represents a second section of bolt, which is applied in case B in the groove formed by concentric arcs $a$ $a'$, and which forms with bolt C an annulus or ring. This bolt has a groove, $f$, of segmental form cut in its under side adapted to receive a stop, $g$, in the bottom of the case, so that when the said bolts are shut into their respective grooves by means of cover-plates F F', section E will be prevented from casually escaping from its case; it has also a lip, $i$, upon its under side, which is adapted to strike against the end of bolt C, projecting slightly out of its case, whenever the lower sash is raised or the upper sash lowered, thus raising bolt C, and disengaging its operating-handle from notch $d$, allowing spring S to react, whereby it will be forced into the open end of the groove occupied by bolt E, forcing the other end thereof to enter the groove of bolt C left vacant by the sliding of the latter.

By this means these bolts will each be partly in one case and partly in the other, and will not only prevent the sashes from being either raised or lowered as long as this engagement exists, but will prevent them from being separated laterally by destroying or removing the outside guiding-strips, and effecting an entry by disconnecting the fastener.

What I claim as new, and desire to secure by Letters Patent, is—

1. The spring S, recessed into bolt C, in combination with sliding segmental bolt E, substantially as specified.

2. The case A, having a slot, c, with notch d, and teeth e, in combination with sliding bolts C E, and spring S, substantially as specified.

In testimony that I claim the above, I have hereunto subscribed my name in the presence of two witnesses.

HENRY A. HOUSE.

Witnesses:
GEO. A. STAPLET,
J. E. DEMHURST.